(12) United States Patent
Morohashi et al.

(10) Patent No.: US 7,415,728 B2
(45) Date of Patent: Aug. 19, 2008

(54) INFORMATION SECURITY POLICY EVALUATION SYSTEM AND METHOD OF CONTROLLING THE SAME

(75) Inventors: Masayuki Morohashi, Fujisawa (JP); Yasuhiko Nagai, Tokyo (JP); Ritsuko Aiba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 775 days.

(21) Appl. No.: 10/817,054

(22) Filed: Apr. 2, 2004

(65) Prior Publication Data
US 2005/0076243 A1 Apr. 7, 2005

(30) Foreign Application Priority Data
Oct. 1, 2003 (JP) ............................. 2003-343480

(51) Int. Cl.
*G06Q 40/00* (2006.01)
*G06F 15/18* (2006.01)
(52) U.S. Cl. ............................................. 726/25; 705/4
(58) Field of Classification Search ................... 705/4; 726/25
See application file for complete search history.

(56) References Cited

U.S. PATENT DOCUMENTS

| 5,621,889 | A * | 4/1997 | Lermuzeaux et al. ......... 726/22 |
| 6,240,530 | B1 * | 5/2001 | Togawa ........................ 714/38 |
| 6,279,113 | B1 * | 8/2001 | Vaidya ......................... 726/23 |
| 6,711,127 | B1 * | 3/2004 | Gorman et al. ............. 370/230 |
| 6,785,732 | B1 * | 8/2004 | Bates et al. .................. 709/232 |
| 6,910,135 | B1 * | 6/2005 | Grainger ....................... 726/23 |
| 7,159,237 | B2 * | 1/2007 | Schneier et al. ................ 726/3 |
| 2002/0040306 | A1 * | 4/2002 | Sugiyama et al. .............. 705/4 |
| 2002/0078381 | A1 * | 6/2002 | Farley et al. ................. 713/201 |
| 2002/0095317 | A1 * | 7/2002 | McCabe ........................ 705/4 |
| 2003/0097409 | A1 * | 5/2003 | Tsai ............................ 709/206 |
| 2004/0006704 | A1 * | 1/2004 | Dahlstrom et al. .......... 713/200 |
| 2005/0022021 | A1 * | 1/2005 | Bardsley et al. ............. 713/201 |

FOREIGN PATENT DOCUMENTS

JP 2002-288371 10/2002

* cited by examiner

*Primary Examiner*—Matthew Heneghan
(74) *Attorney, Agent, or Firm*—Townsend and Townsend and Crew LLP

(57) ABSTRACT

In order to provide an information security policy evaluation system in which information security policies can be efficiently and appropriately defined and operated in an organization, such as a corporation, treated threats operated on a second site are transmitted from a second information processing apparatus on the second site to a first information processing apparatus on a first site, threat information is transmitted from a third site collecting information on threats to the first information processing apparatus on the first site. The first information processing apparatus extracts treated threats which have been effective for threats having occurred actually, and untreated threats, out of the received treated threat and generates an evaluation report in which these are described. Moreover, a compensation amount of insurance against threats is changed based on the generated evaluation report.

12 Claims, 12 Drawing Sheets

TREATED THREAT DATA MANAGEMENT TABLE 400

| 401 THREAT CATEGORY CODES | 402 THREAT CATEGORIES | 403 TREATED THREAT CODES | 404 TREATED THREAT LISTS |
|---|---|---|---|
| 100 | INTRUSION INTO SYSTEM | P1001 | LOCATING OF BACK DOOR |
| | | P1002 | WORM INFECTION |
| 200 | ATTACK LEADING TO INTERFERENCE WITH OPERATION OF SERVICE | P2001 | MASS ACCESS TO WEB SERVER |
| 300 | SUSPICIOUS ACCESS SUCH AS SCAN | P3001 | ATTEMPT TO LOG IN TO FTP SERVER |
| | | P3002 | ATTEMPT AT WORM INFECTION |
| ... | ... | ... | ... |

FIG. 4

THREAT DATA MANAGEMENT TABLE 500

| 501 THREAT CATEGORY CODES | 502 THREAT CATEGORIES | 503 THREAT CODES | 504 THREAT INFORMATION | 505 DAMAGE AMOUNT |
|---|---|---|---|---|
| 200 | ATTACK LEADING TO INTERFERENCE WITH OPERATION OF SERVICE | K2001 | MASS ACCESS TO WEB SERVER | 1 MILLION YEN/YEAR |
| | | K5001 | RECEPTION OF ENORMOUS AMOUNT OF ICMP PACKETS | 0.8 MILLION YEN/YEAR |
| 300 | SUSPICIOUS ACCESS SUCH AS SCAN | K3001 | ATTEMPT TO LOG IN TO FTP SERVER | 0.5 MILLION YEN/YEAR |
| | | K5002 | WEAKNESS SEARCH FOR HTTP SERVER | 0.6 MILLION YEN/YEAR |
| ... | ... | ... | ... | ... |

FIG. 5

CORRESPONDENCE DATA MANAGEMENT TABLE 600

| TREATED THREAT CODES 601 | TREATED THREAT LISTS 602 | THREAT CODES 603 | THREAT INFORMATION 604 |
|---|---|---|---|
| ⋮ | ⋮ | ⋮ | ⋮ |
| P2001 | MASS ACCESS TO WEB SERVER | K2001 | MASS ACCESS TO WEB SERVER |
| P3001 | ATTEMPT TO LOG IN TO FTP SERVER | K3001 | ATTETMPT TO LOG IN TO FTP SERVER |
| ⋮ | ⋮ | ⋮ | ⋮ |

FIG. 6

POLICY EVALUATION REPORT 700

701 <THREATS ON WHICH COUNTERMEASURES HAVE HAD LARGE EFFECTS WHEN THE COUNTERMEASURES HAVE BEEN TAKEN>

| RANKS OF EFFECTS | TREATED THREATS 702 | DAMAGE AMOUNT WHEN UNTREATED 703 |
|---|---|---|
| 1 | MASS ACCESS TO WEB SERVER | 1 MILLION YEN/YEAR |
| 2 | ATTEMPT TO LOG IN TO FTP SERVER | 0.5 MILLION YEN/YEAR |
| ... | ... | ... |

FIG. 7

POLICY EVALUATION REPORT

<THREATS WHICH SHOULD BE CONSIDERED WHEN POLICIES ARE REVISED>

| REVISE PRIORITIES | UNTREATED THREATS | ASSUMED DAMAGE AMOUNT |
|---|---|---|
| 1 | RECEPTION OF ENORMOUS AMOUNT OF ICMP PACKETS | 0.8 MILLION YEN/YEAR |
| 2 | WEAKNESS SEARCH FOR HTTP SERVER | 0.6 MILLION YEN/YEAR |
| ... | ... | ... |

FIG. 8

INFORMATION SECURITY POLICY EVALUATION SYSTEM AND METHOD OF CONTROLLING THE SAME

CROSS-REFERENCE TO RELATED APPLICATIONS

This application claims priority based on a Japanese patent application, No. 2003-343480 filed on Oct. 1, 2003, the entire contents of which are incorporated herein by reference.

BACKGROUND OF THE INVENTION

The present invention relates to an information security policy evaluation system and a method of controlling the same. In particular, the present invention relates to technologies for efficiently and appropriately defining and operating information security policies in an organization such as a corporation.

With the advances of IT related industries, threats for information processing systems have become problems. In organizations, such as corporations, countermeasures against these threats are being advanced. Organizations promoting information security management which is compliant with BS7799 (British information security management standard) are increasing. The information security management system (ISMS) conformity assessment scheme and the like promoted by the Japan Information Processing Development Corporation (JIPDEC) are drawing attention, and information security policies have come to be defined and operated in many organizations.

SUMMARY OF THE INVENTION

The effectiveness of information security policies defined and operated in organizations, such as corporations, is judged based on information grasped when the information security policies have been defined. Accordingly, it is impossible to know whether information security policies already defined and operated will be necessarily effective in the future. This is because the types and contents of threats affecting information processing systems are constantly changing with the advance in technology and the change in physical and human environments surrounding the information processing systems. Therefore, organizations, such as corporations, have to evaluate or review the validity of defined and operated information security policies as needed. Here, in order to appropriately perform such evaluation and review, the collection of information on threats including information on unauthorized access having occurred in the past on communication networks needs to be performed, and a wealth of knowledge and experience in information security is also required.

However, collecting information on threats and maintaining a technical level required to perform evaluation and review by organizations themselves, such as corporations, are heavy burdens to the organizations. Moreover, in the case where an organization, such as a corporation, performs evaluation and review by itself, objectivity is lost, and appropriate judgment may not be made.

In Japanese Laid Open Patent Publication No. 2002-288371, a maintenance fee and premium setting system is disclosed in which a user of mechanical equipment can reduce the payment of a maintenance fee and a premium depending on the maintenance of the mechanical equipment, in which a maker can reduce the payment of maintenance costs, and in which an insurance company can reduce the payment of insurance. In this technology, a maintenance evaluation system obtains maintenance information on the mechanical equipment through a communication line, and determines the maintenance fee based on a maintenance contract and the maintenance information. Here, in order to evaluate or review the validity of information security policies, the effectiveness of countermeasures already taken and missing countermeasures need to be grasped. However, in the technology described in the Japanese Laid Open Patent Publication No. 2002-288371, missing countermeasures can be grasped, but it is impossible to know the worth and effectiveness of countermeasures already taken.

The present invention has been accomplished in light of the above background. An object of the present invention is to provide an information security policy evaluation system in which information security policies can be efficiently and appropriately defined and operated in an organization such as a corporation.

One major invention of the present invention for achieving the above object is an information security policy evaluation system including a first information processing apparatus located on a first site, a second information processing apparatus located on a second site, and a third information processing apparatus located on a third site. The first to third information processing apparatuses are capable of communicating with each other. The second information processing apparatus has a treated threat data storage section for storing treated threat data. The treated threat data is data indicating a threat which an information security policy operated on the second site can counter. The third information processing apparatus has a threat data storage section for storing threat data which is data indicating a threat having occurred in a past. The second information processing apparatus has a treated threat data transmission section for transmitting the treated threat data to the first information processing apparatus. The third information processing apparatus has a threat data transmission section for transmitting the threat data to the first information processing apparatus. The first information processing apparatus has a treated threat data reception section for receiving the treated threat data and a threat data reception section for receiving the threat data. The first information processing apparatus has a correspondence data storage section for storing correspondence data which is data indicating correspondence between the threat data and the treated threat data. The first information processing apparatus has an effective treated threat data extraction section for extracting a piece of treated threat data to which there is a piece of threat data corresponding in the threat data received by the threat data reception section, out of the treated threat data received by the treated threat data reception section, based on the correspondence data, and an evaluation data generation section for generating evaluation data in which the extracted treated threat data is described.

The second site is, for example, a site of a customer who requests the evaluation of the information security policy. The third site is, for example, a site of a threat information provider who provides threat information. The threat information provider is collecting information on threats and providing the information. The first site is, for example, a site of an evaluator who evaluates the information security policy operated on the second site in compliance with a request from the customer.

According to the present invention, the first information processing apparatus extracts a piece of treated threat data to which there is a piece of threat data corresponding in the threat data received by the threat data reception section, out of the treated threat data received by the treated threat data reception section, based on the correspondence data, and generates evaluation data in which the extracted treated threat data is described. Here, the information security policy indicated by the treated threat data described in this evaluation data is an information security policy which has been effective against a threat having occurred actually. Therefore, the validity of the information security policy defined and operated on the second site can be evaluated based on the evaluation data. Thus, the evaluation data indicating the validity of the information security policy on the second site is created on the first site, whereby an organization, such as a corporation, operating the second site does not need to collect information on threats by itself in order to evaluate and review the information security policy defined and operated by itself, and is released from management load of maintaining a technical level required to evaluate and review the information security policy. Therefore, in the organization operating the second site, the evaluation and review of the information security policy can be efficiently performed. Moreover, unlike a report which simply points out untreated threats, in the evaluation report of the invention, the evaluation of effect, worth, effectiveness, and the like of the information security policy which has been already operated is described. Therefore, the evaluation report becomes a useful material which motivates the top management (the president, executives including an information security executive, and the like) and members (employees and the like) of the organization to understand the effect, worth, effectiveness, and the like of the information security policy and obey the information security policy. Utilizing the evaluation report expedites the smooth operation of information security management in the organization. Furthermore, since the information security policy is evaluated and reviewed based on data which is transmitted from the third information processing apparatus and which indicates threats having occurred in the past, objective evaluation is performed, and the information security policy defined and operated on the second site can be appropriately evaluated and reviewed.

Another major aspect of the present invention is an information security policy evaluation system including a first information processing apparatus located on a first site, a second information processing apparatus located on a second site, and a third information processing apparatus located on a third site. The first to third information processing apparatuses are capable of communicating with each other. The second information processing apparatus has a treated threat data storage section for storing treated threat data. The treated threat data is data indicating a threat which an information security policy operated on the second site can counter. The third information processing apparatus has a threat data storage section for storing threat data which is data indicating a threat having occurred in a past. The second information processing apparatus has a treated threat data transmission section for transmitting the treated threat data to the first information processing apparatus. The third information processing apparatus has a threat data transmission section for transmitting the threat data to the first information processing apparatus. The first information processing apparatus has a treated threat data reception section for receiving the treated threat data and a threat data reception section for receiving the threat data. The first information processing apparatus has a correspondence data storage section for storing correspondence data which is data indicating correspondence between the threat data and the treated threat data. The first information processing apparatus has an untreated threat data extraction section for extracting a piece of threat data to which there is no piece of treated threat data corresponding in the treated threat data received by the treated threat data reception section, out of the threat data received by the threat data reception section, based on the correspondence data, and an evaluation data generation section for generating evaluation data in which the extracted threat data is described.

According to the present invention, the first information processing apparatus extracts a piece of threat data to which there is no piece of treated threat data corresponding in the treated threat data received by the treated threat data reception section, out of the threat data received by the threat data reception section, based on the correspondence data, and generates evaluation data in which the extracted threat data is described.

Here, a threat indicated by the threat data described in this evaluation data is a threat having occurred actually, and a threat for which any effective information security policy has not been operated on the second site. Therefore, on the second site, this evaluation data is used as, for example, information indicating a threat which should be preferentially treated at the next time when the information security policy will be revised. Thus, the evaluation data indicating a missing information security policy on the second site is automatically created on the first site, whereby an organization, such as a corporation, operating the second site does not need to collect information on threats by itself in order to evaluate and review the information security policy defined and operated by itself, and is released from management load of maintaining a technical level required to evaluate and review the information security policy. Therefore, in the organization operating the second site, the evaluation and review of the information security policy can be efficiently performed. Moreover, unlike a report which simply points out untreated threats, in the evaluation report of the invention, the evaluation of effect, worth, effectiveness, and the like of the information security policy which has been already operated is described. Therefore, the evaluation report becomes a useful material which motivates the top management (the president, executives including an information security executive, and the like) and members (employees and the like) of the organization to understand the effect, worth, effectiveness, and the like of the information security policy and obey the information security policy. Utilizing the evaluation report expedites the smooth operation of information security management in the organization. Furthermore, since the information security policy is evaluated and reviewed based on data which is transmitted from the third information processing apparatus and which indicates threats having occurred in the past, objective evaluation is performed, and the information security policy defined and operated on the second site can be appropriately evaluated and reviewed.

According to the present invention, information security policies in an organization, such as a corporation, can be efficiently and appropriately defined and operated.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 4 is a view showing an example of a treated threat data management table according to the embodiment.

FIG. 5 is a view showing an example of a threat data management table according to the embodiment.

FIG. 6 is a view showing an example of a correspondence data management table according to the embodiment.

FIG. 7 is a view showing an example of an evaluation report (threats on which countermeasures have had large effects when the countermeasures have been taken) according to the embodiment.

FIG. 8 is a view showing an example of an evaluation report (threats which should be considered when policies are revised) according to the embodiment.

DETAILED DESCRIPTION OF THE INVENTION

Hereinafter, embodiments of the present invention will be described in detail in conjunction with the drawings.

First Embodiment

Figure 1:
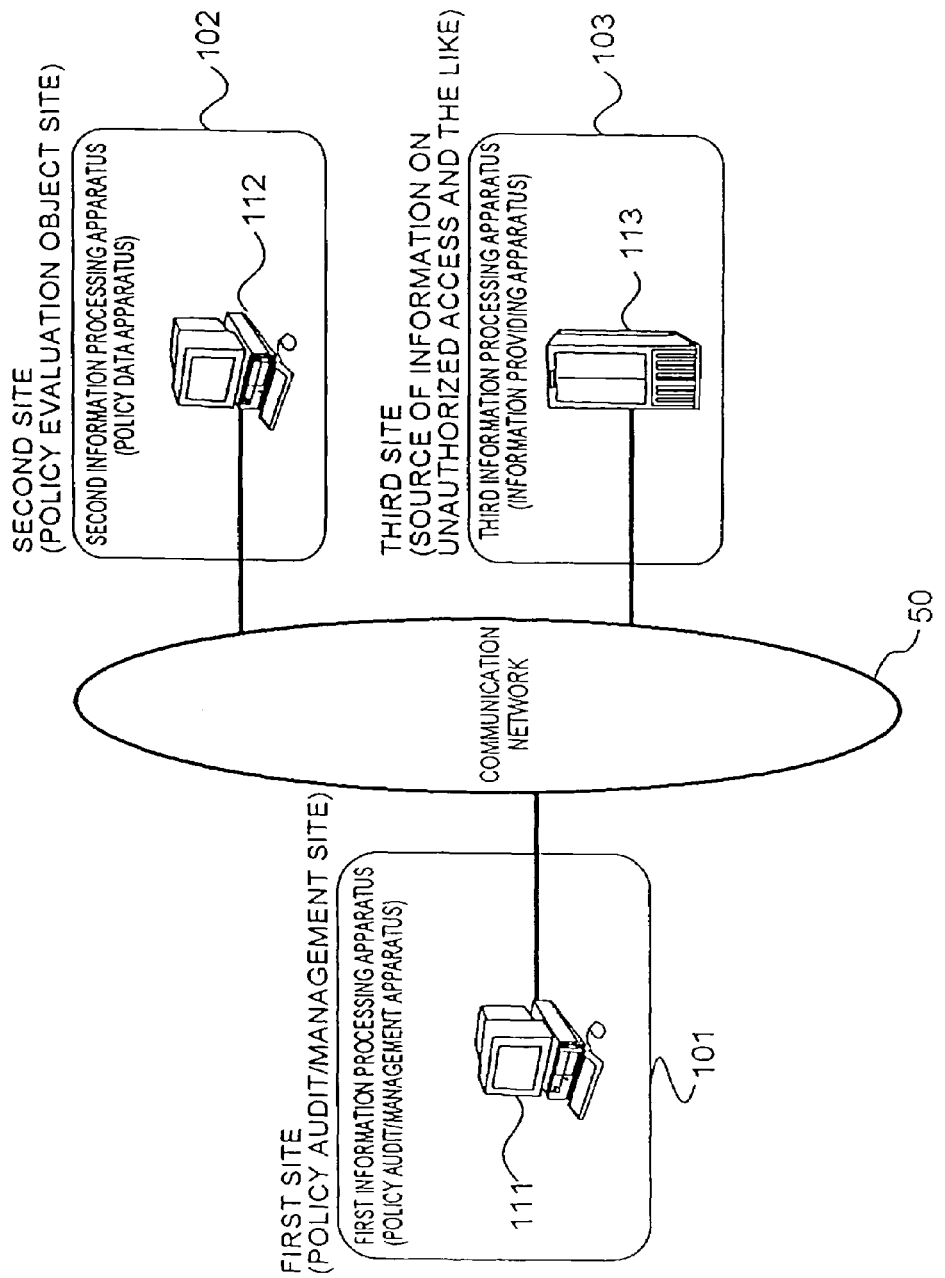
FIG. 1 is a view showing a schematic configuration of an information security policy evaluation system according to a first embodiment.

In FIG. 1, a schematic configuration of an information security policy evaluation system (hereinafter also referred to as policy evaluation system), which will be described as a first embodiment of the present invention, is shown. In this drawing, a first site 101 is a site of an evaluator who evaluates information security policies operated on a second site 102 in compliance with a request from a customer. The second site 102 is a site of the customer who requests the evaluator to evaluate the information security policies. A third site 103 is a site of a threat information provider who provides threat information. The threat information provider is collecting information on threats and providing the information. The threat information provider is a source of information on unauthorized access and the like. For example, the Japan Computer Emergency Response Team/Coordination Center (JPCERT/CC), a media center of reports/news or the like, or the like can be the threat information provider.

On the first site 101, a first information processing apparatus 111 is provided. On the second site 102, a second information processing apparatus 112 is provided. On the third site 103, a third information processing apparatus 113 is provided. The first to third information processing apparatuses 111, 112, and 113 are individually connected to a communication network 50, such as the Internet or a dedicated line. The first to third information processing apparatuses 111, 112, and 113 are connected to each other through the communication network 50 such that they can communicate with each other. As the first to third information processing apparatuses 111, 112, and 113, computers including personal computers, office computers, mainframes, and the like are used.

An information security policy, which becomes an evaluation object of the policy evaluation system in the present embodiment, will be described. An information security policy is created by defining a basic policy, action criteria, and the like for information security for ensuring confidentiality, completeness, availability, and the like of an information system in an organization, such as a corporation, in order to protect information assets owned by the organization. With the progression of the IT society, defining and operating information security policies have become social duty of an organization, such as a corporation. In recent years, organizations which do not define appropriate information security policies often cannot participate in open trade markets of B-to-B and the like. Specifically, information security policies are expressed as a document described hierarchically. Basic policies on information security related to external network connections are taken as examples of information security policies. These basic policies include, for example, standards related to the use of the Internet, standards related to external disclosure, standards related to connections using dedicated lines and VPNs, standards related to remote access, standards related to virus countermeasures, standards related to the privacy of customers, standards related to information security education, standards related to penalties, standards related to standard update procedures, and the like. Moreover, the standards related to the use of the Internet include, for example, a standard related to the use of electronic mail, a standard related to the use of the Web, a standard related to account management, and the like. Furthermore, the standard related to the use of electronic mail includes criteria as follows: intracompany electronic mail must not be transferred to external mail servers, classified information must not be transmitted to the outside, mail accounts must not be carelessly disclosed to the outside, the possibility that viruses exist in the attached files of electronic mail must be considered, and the like.

Figure 2:
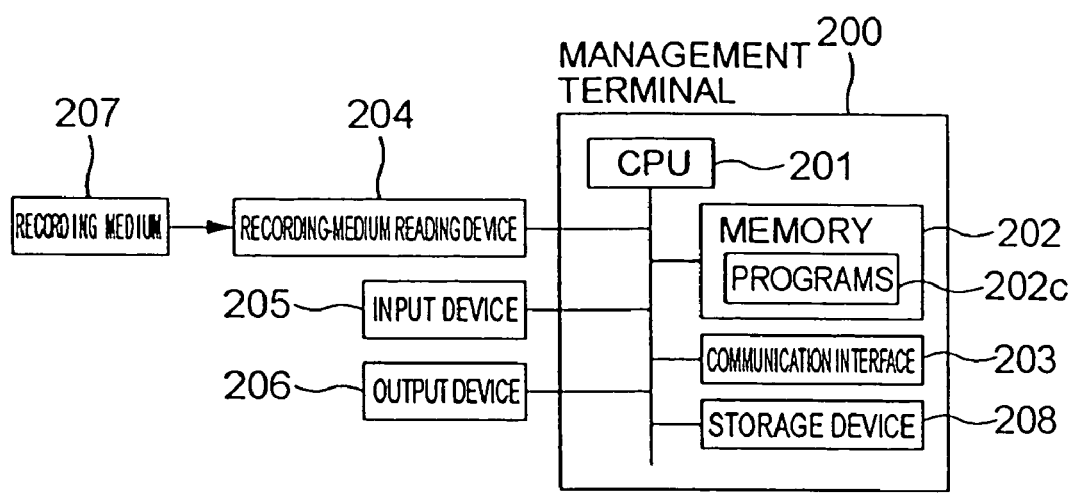
FIG. 2 is a diagram showing the hardware configuration of each of first to third information processing apparatuses according to the embodiment.

In FIG. 2, a typical hardware configuration of a computer used as each of the first to third information processing apparatuses 111, 112, and 113 is shown. A CPU 201 is intended to control the information processing apparatus, and implements various kinds of functions and the like by executing programs 202c stored on a memory 202, such as a RAM or a ROM, and a storage device 208. A recording-medium reading device 204 is a device for reading a program or data recorded on a recording medium 207. The read program or data are stored on the memory 202 or the storage device 208. Therefore, for example, a program 202c recorded on the recording medium 207 can be read from the recording medium 207 by using the recording-medium reading device 204 to be stored on the memory 202 or the storage device 208. For example, data to be stored on the aforementioned database are stored on the memory 202 or the storage device 208. As the recording medium 207, a flexible disk, a CD-ROM, a DVD-ROM, a semiconductor memory, or the like can be used.

The recording-medium reading device 204 may be contained in the computer 200 or may be externally attached thereto. The storage device 208 is, for example, a hard disk drive, a flexible disk drive, a semiconductor storage device, or the like. An input device 205 is used for data input and the like to the computer 200 by an operator or the like. As the input device 205, for example, a keyboard, a mouse, or the like is used. An output device 206 is a device for outputting information to the outside. As the output device 206, for example, a display, a printer, or the like is used. A communication interface 203 is an interface for connecting the computer 200 to the communication network. The computer 200 can communicate with external devices, such as other computers, through the communication interface 203. Note that each of the first to third information processing apparatuses 111, 112, and 113 does not necessarily need to have all hardware described above.

Figure 3:
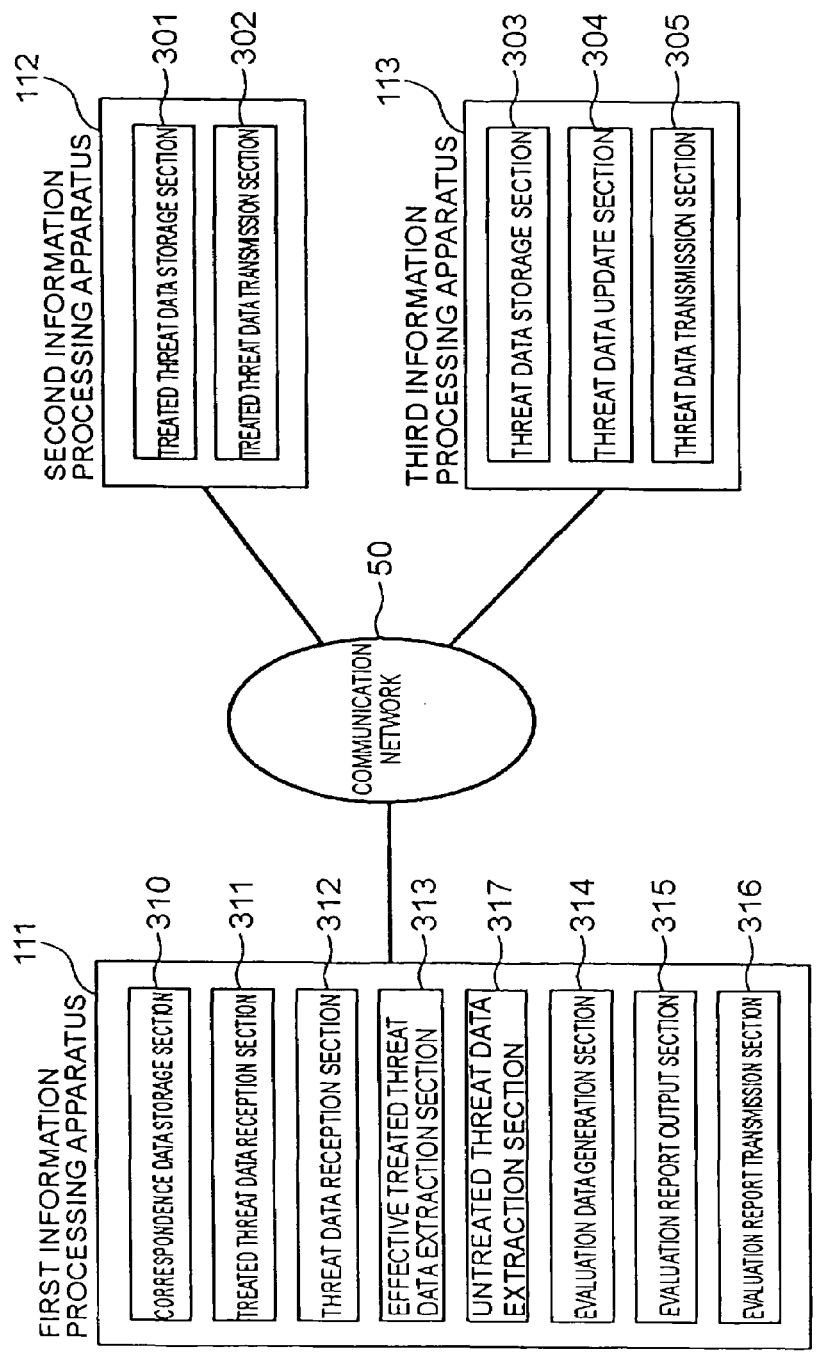
FIG. 3 is a diagram showing various kinds of functions implemented in the first to third information processing apparatuses according to the embodiment.

Next, various kinds of functions implemented by executing programs in the first to third information processing apparatuses 111, 112, and 113 will be described. FIG. 3 shows various kinds of functions implemented in the first to third information processing apparatuses 111, 112, and 113. A treated threat data storage section 301 of the second information processing apparatus 112 is the function of storing treated threat data. The treated threat data is data in which information indicating contents corresponding to information security policies defined and operated on the second site 102 is described. The treated threat data is managed in a treated threat data management table. In FIG. 4, an example of the treated threat data management table is shown. The treated threat data is divided into threat categories to be managed. In the threat data management table 400 shown in this drawing, threat category codes, which are identifiers uniquely given to the threat categories, are set in the column for threat category codes 401. In the column for threat categories 402, character strings indicating the contents of the threat categories are set. In the column 403 for treated threats, identifiers specifying the treated threat data are set. In the column for treated threat lists 404, character strings indicating the contents of the treated threat data are set.

A treated threat data transmission section 302 of the second information processing apparatus 112 is the function of transmitting the treated threat data management table 400 stored in the treated threat data storage section 301 to the first information processing apparatus 111 through the communication network 50. The treated threat data transmission section 302 has the function of accepting operation input by an operator or the like from the input device 205 and scheduling the timing when the second information processing apparatus 112 transmits the treated threat data management table 400 to the first information processing apparatus 111 in accordance with the accepted input. The treated threat data transmission section 302 has the function of automatically transmitting the treated threat data management table 400 to the first information processing apparatus 111 when the scheduled timing has come. Note that, as the transmission timing in this case, for example, immediate execution, every day, every week, every month, designated date and time, or the like can be set.

A threat data storage section 303 of the third information processing apparatus 113 has the function of storing threat data. The threat data is data in which information on threats having occurred in the communication network 50 or in an apparatus connected to the communication network 50 in the past is described. The third information processing apparatus 113 has, for example, a threat data update section 304 for updating the threat data stored in the threat data storage section 303. The threat data update section 304 updates the threat data based on, for example, information which is related to a threat and which has been received through the communication network 50 from an apparatus connected to the communication network 50. Moreover, the threat data update section 304, for example, detects a threat having occurred in the communication network 50 and generates threat data corresponding to the detected threat to store the threat data. Furthermore, the threat data update section 304 accepts the input of information on a threat by an input operation by an operator or the like from the input device 205 or by reading data from the recording medium 207 or the like, and generates threat data corresponding to the accepted information on a threat to store the data.

Threat data is managed in a threat data management table. In FIG. 5, an example of the threat data management table stored in the threat data storage section 303 is shown. In the present embodiment, the threat data is divided into threat categories to be managed. In the threat data management table 500 shown in this drawing, in the column 501 for threat category codes, identifiers uniquely given to the threat categories are set. The correspondence between the threat category and the identifier is similar to that in the case of the aforementioned treated threat data management table 400. In the column 502 for threat categories, character strings indicating the contents of the threat categories are set. In the column 503 for threat codes, identifiers specifying the threat data are set. In the column 504 for threat information, character strings indicating the contents of the threat data are set. In the column 505 for damage amounts, loss amount data, which is data each indicating the magnitude of a loss occurring in the case where damage is suffered due to the relevant threat, is set. As the loss amount data, for example, a damage amount generated in the case where the second site 102 is damaged by a threat is employed.

Each damage amount illustrated in FIG. 5 is a total damage amount which a given site is expected to suffer for a year. This damage amount is found by using, for example, a damage amount generated by a threat suffered because the given site was not operating an effective information security policy, and the occurrence probability of the threat during the past one year on the site. The respective pieces of loss amount data for threats are basically managed on the third site 103 and appropriately notified from an administrator of the third site 103 to an administrator of the first site 101. An operational form may be employed in which loss amount data is not managed in the third information processing apparatus 103 but managed on the first site 101.

A threat data transmission section 305 of the third information processing apparatus 113 transmits the contents of the threat data management table 500 stored in the threat data storage section 303 to the first information processing apparatus 111 through the communication network 50. The threat data transmission section 305 accepts operation input by an operator or the like from the input device 205 and schedules the timing when the second information processing apparatus 112 transmits the threat data management table 400 to the first information processing apparatus 111 in accordance with the accepted input. The threat data transmission section 305 has the function of automatically transmitting threat data to the first information processing apparatus 111 when the scheduled timing has come. As the transmission timing in this case, for example, immediate execution, every day, every week, every month, designated date and time, or the like can be set. The threat data transmission section 305 also has the function of scheduling the automatic transmission of the threat data management table 500 or update differences to the first information processing apparatus 111 in the case where the contents of the threat data management table 500 have been updated by the threat data update section 304.

A correspondence data storage section 310 of the first information processing apparatus 111 is the function of storing a correspondence data management table in which data (hereinafter referred to as correspondence data) indicating the correspondence between threat data and treated threat data indicating effective information security policies against threats indicated by the threat data is described. In FIG. 6, an example of the correspondence data management table 600 is shown. In the correspondence data management table 600, the correspondence between threat data and treated threats, which are effective information security policies against the threat data, is described. In the column 601 for treated threat codes, identifiers specifying treated threat data are set. In the column 602 for treated threat lists, character strings indicating the contents of the treated threat data are set. In the column 603 for threat codes, identifiers specifying threat data corresponding to the treated threat data are set. In the column 604 for threat information, character strings indicating the contents of the threat data corresponding to the treated threat data are set.

A treated threat data reception section 311 of the first information processing apparatus 111 receives the treated threat data management table 400 transmitted from the treated threat data transmission section 302 of the second information processing apparatus 112 and stores the treated threat data management table 400. A threat data reception section 312 of the first information processing apparatus 111 receives the threat data management table 500 transmitted from the threat data transmission section 305 of the third information processing apparatus 113 and stores the threat data management table 500.

An effective treated threat data extraction section 313 of the first information processing apparatus 111 extracts a piece of treated threat data to which there is a piece of threat data corresponding in the threat data received by the threat data reception section 312, out of the treated threat data received by the treated threat data reception section 311, based on the correspondence data. For example, it is assumed that the treated threat data reception section has received the treated threat data management table 400 of FIG. 4, and that the threat data reception section 312 has received the threat data management table 500 shown in FIG. 5. In this case, for the piece of treated threat data "mass access to a Web server" out of the treated threat data (treated threats) of the treated threat data management table 400, there is the corresponding piece of threat data in the threat data management table 500 of FIG. 5. Accordingly, the relevant piece of treated threat data becomes an object of the extraction by the effective treated threat data extraction section 313.

An evaluation data generation section 314 of the first information processing apparatus 111 generates evaluation data in which the treated threat data extracted by the effective treated threat data extraction section 313 is described. Here, in the generation of the evaluation data, the evaluation data generation section 314 sorts the treated threat data extracted by the effective treated threat data extraction section 313 in descending order of the loss amount data for the threat data related to the treated threat data in the aforementioned correspondence data. An evaluation report output section 315 of the first information processing apparatus 111 outputs an evaluation report in which the evaluation data generated by the evaluation data generation section 314 is described, to the output device 206, such as a display, a printer, or the like, of the first information processing apparatus 111. An evaluation report transmission section 316 of the first information processing apparatus 111 transmits the evaluation report to the second information processing apparatus 112 through the communication network 50 by means of electronic mail or the like.

In FIG. 7, an example of the evaluation report is shown. In the column 701 for ranks of effects in the evaluation report 700 shown in this drawing, the ranks of treated threat data sorted in descending order of loss amount data are described. In the column 702 for treated threats, the contents of the information security policies corresponding to the treated threat data are described. In the column 703 for damage amounts when untreated, loss amount data is described. In this drawing, the loss amount data described in the column 703 for damage amounts when untreated is an assumed damage amount.

Here, the information security policies indicated by the treated threat data described in the evaluation report 700 are information security policies which have been effective for threats actually having occurred. Therefore, the validity of information security policies defined and operated on the second site 102 can be evaluated based on the evaluation report. Thus, an evaluation report indicating the validity of information security policies on the second site 102 is created on the first site 101, whereby an organization, such as a corporation or the like, which is a customer and which operates the second site 102 can reduce the labor of collecting information on threats by itself in order to evaluate or review the information security policies which the organization itself is defining and operating. Moreover, the organization operating the second site 102 is released from management load of maintaining a technical level required to evaluate and review information security policies. Therefore, in the organization operating the second site 102, information security policies can be efficiently evaluated and reviewed. Further, information security policies are evaluated or reviewed based on the threat data, which are transmitted from the third information processing apparatus 113 and which is data indicating threats having occurred in the past. Accordingly, the evaluation is objectively performed, and the effect and effectiveness of information security policies defined and operated on the second site 102 can be appropriately evaluated or reviewed. In addition, unlike a report which simply points out untreated threats, in the evaluation report of the present embodiment, the evaluation of effect, worth, effectiveness, and the like of information security policies which has been already operated is described. Therefore, the evaluation report becomes a useful material which motivates the top management (the president, executives including an information security executive, and the like) and members (employees and the like) of the organization to, understand the effect, worth, effectiveness, and the like of the information security policies and obey the information security policies. Utilizing the evaluation report expedites the smooth operation of information security management in the organization. Furthermore, in the evaluation report, the treated threat data is sorted in descending order of the loss amount data. Here, as described previously, the loss amount data is, for example, a damage amount generated in the case where the second site 102 has been damaged by a threat. Since the treated threat data is sorted in descending order of the loss amount data in this way, a customer can easily grasp which information security policy had a large effect by, for example, referring to the evaluation report.

An untreated threat data extraction section 317 of the first information processing apparatus 111 extracts a piece of threat data to which there is no piece of treated threat data corresponding in the treated threat data received by the treated threat data reception section 311, out of the threat data received by the threat data reception section 312, based on the correspondence data. For example, for the piece of threat data "reception of an enormous amount of ICMP packets" out of the threat data in the threat data management table 500 of FIG. 5, there is no corresponding piece of treated threat data in the treated threat data management table 400 of FIG. 4. Accordingly, the relevant piece of threat data becomes an object of the extraction by the untreated threat data extraction section 317.

The evaluation data generation section 314 of the first information processing apparatus 111 generates evaluation data in which the threat data extracted by the untreated threat data extraction section 317 is described. Here, in the generation of the evaluation data, the evaluation data generation section 314 sorts the threat data extracted by the untreated threat data extraction section 317 in descending order of the loss amount data related to the threat data in the aforementioned correspondence data. The evaluation report output section 315 of the first information processing apparatus 111 outputs an evaluation report in which the evaluation data generated by the evaluation data generation section 314 is described, to the output device 206, such as a display, a printer, or the like, of the first information processing apparatus 111. The evaluation report transmission section 316 of the first information processing apparatus 111 transmits the evaluation report to the second information processing apparatus 112 through the communication network 50 by means of electronic mail or the like.

In FIG. 8, an example of the evaluation report is shown. In the column 801 for revise priorities in the evaluation report 800 shown in this drawing, the priorities of the threat data sorted in descending order of the loss amount data are described. It can be said that, as the priorities increase, threats more greatly require that information security policies are preferentially defined. In the column 802 for untreated threats, the contents of the threats corresponding to the threat data are described. In the column 803 for assumed damage amounts, loss amount data is described.

Here, the threats indicated by the threat data described in this evaluation report 800 are threats actually having occurred, and are threats for which any effective information security policies have not been operated on the second site 102. Therefore, this evaluation report is used as, for example, on the second site 102, information indicating threats which should be preferentially treated at the next time when information security policies will be revised. Thus, an evaluation report indicating information security policies which are insufficient on the second site 102 is automatically created on the first site 101, whereby an organization, such as a corporation or the like, which operates the second site 102 can reduce the labor of collecting information on threats by itself in order to evaluate or review the information security policies which the organization itself is defining and operating. Moreover, the organization operating the second site 102 is released from management load of maintaining a technical level required to evaluate and review information security policies. Therefore, in the organization operating the second site 102, information security policies can be efficiently evaluated and reviewed. Further, information security policies are evaluated or reviewed based on the threat data, which are transmitted from the third information processing apparatus 113 and which is data indicating threats having occurred in the past. Accordingly, the evaluation is objectively performed, and the effect, worth, effectiveness, and the like of information security policies defined and operated on the second site 102 can be appropriately evaluated or reviewed. In addition, unlike a report which simply points out untreated threats, in the evaluation report of the present embodiment, the evaluation of effect, worth, effectiveness, and the like of information security policies which has been already operated is described. Therefore, the evaluation report becomes a useful material which motivates the top management (the president, executives including an information security executive, and the like) and members (employees and the like) of the organization to understand the effect, worth, effectiveness, and the like of information security policies and obey the information security policies. Utilizing the evaluation report expedites the smooth operation of information security management in the organization. Furthermore, in the evaluation report, threat data is sorted in descending order of loss amount data. Here, as described previously, the loss amount data is, for example, a damage amount generated in the case where the second site 102 has been damaged by a threat. Since the threat data is sorted in descending order of the loss amount data in this way, a customer, for example, can easily grasp threats which should be preferentially considered at the time and the like when information security policies are revised, by referring to the evaluation report.

Figure 9:
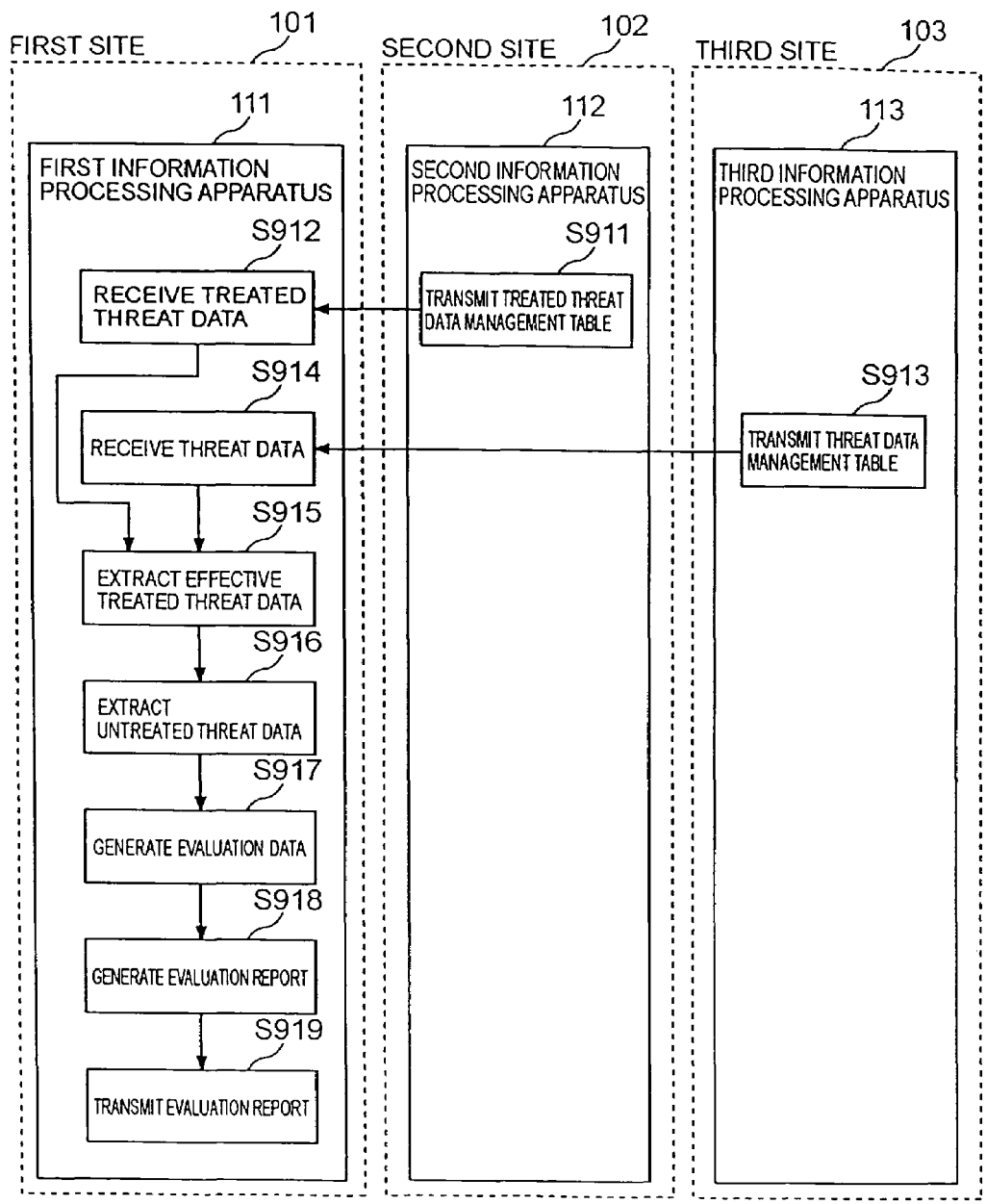
FIG. 9 is a diagram showing a flowchart for explaining the flow of a process related to the evaluation of information security policies according to the embodiment.

Next, the flow of a process related to the evaluation of the information security policies defined and operated on the second site 102 by using the information security policy evaluation system of the present embodiment will be described in conjunction with the flowchart shown in FIG. 9.

First, the treated threat data transmission section 302 of the second information processing apparatus 112 transmits the treated threat data management table 400 stored in the treated threat data storage section 301 to the first information processing apparatus 111 at a predetermined timing (S911). The treated threat data reception section 311 of the first information processing apparatus 111 receives the transmitted treated threat data management table 400 and stores the same (S912).

The threat data transmission section 305 of the third information processing apparatus 113 transmits the threat data management table 500 stored in the threat data storage section 303 to the first information processing apparatus 111 at a predetermined timing (S913). The threat data reception section 312 of the first information processing apparatus 111 receives the threat data management table 500 and stores the same (S914).

Next, the effective treated threat data extraction section 313 of the first information processing apparatus 111 extracts a piece of treated threat data to which there is a piece of threat data corresponding in the threat data received by the threat data reception section 312, out of the treated threat data received by the treated threat data reception section 311, based on the correspondence data (S915). Moreover, the untreated threat data extraction section 317 of the first information processing apparatus 111 extracts a piece of threat data to which there is no piece of treated threat data corresponding in the treated threat data received by the treated threat data reception section 311, out of the threat data received by the threat data reception section 312, based on the correspondence data (S916).

Subsequently, the evaluation data generation section 314 generates evaluation data in which the extracted treated threat data is described (S917). The evaluation report output section 315 outputs an evaluation report in which the evaluation data generated by the evaluation data generation section 314 is described to the output device 206, such as a display, a printer, or the like, of the first information processing apparatus 111 (S918). The evaluation report transmission section 316 of the first information processing apparatus 111 transmits the evaluation report to the second information processing apparatus 112 through the communication network by means of electronic mail or the like (S919).

Incidentally, in the embodiment described above, the treated threat data are stored in the second information processing apparatus 112 and transmitted to the first information processing apparatus 111. However, in order to eliminate management load of managing the treated threat data on the second site, which is a site of a customer, for example, the following mode may be adopted. Specifically, first, policy data, which is data indicating information security policies operated on the second site, is stored in the second information processing apparatus 112 (policy data storage section). The second information processing apparatus transmits the policy data to the first information processing apparatus 111 (policy data transmission section). The first information processing apparatus 111 receives the policy data (policy data reception section). The first information processing apparatus 111 stores correspondence data, which is data indicating the correspondence between threat data and policy data indicating effective information security policies against the threats indicated by the threat data. Then, the first information processing apparatus 111 (effective policy data extraction section) extracts a piece of policy data to which there is a piece of threat data corresponding in the threat data received by the threat data reception section 312, out of the received policy data based on the correspondence data, and generates evaluation data in which the extracted policy data is described. Moreover, the first information processing apparatus 111 extracts a piece of threat data to which there is no piece of policy data corresponding in the policy data received by the policy data reception section, out of the threat data received by the threat data reception section 312, based on the correspondence data, and generates evaluation data in which the extracted threat data is described. According to such a configuration, the second information processing apparatus 112 does not need to manage treated threat data as long as the second information processing apparatus 112 manages policy data, which is data indicating information security policies operated on the second site.

Second Embodiment

Figure 10:
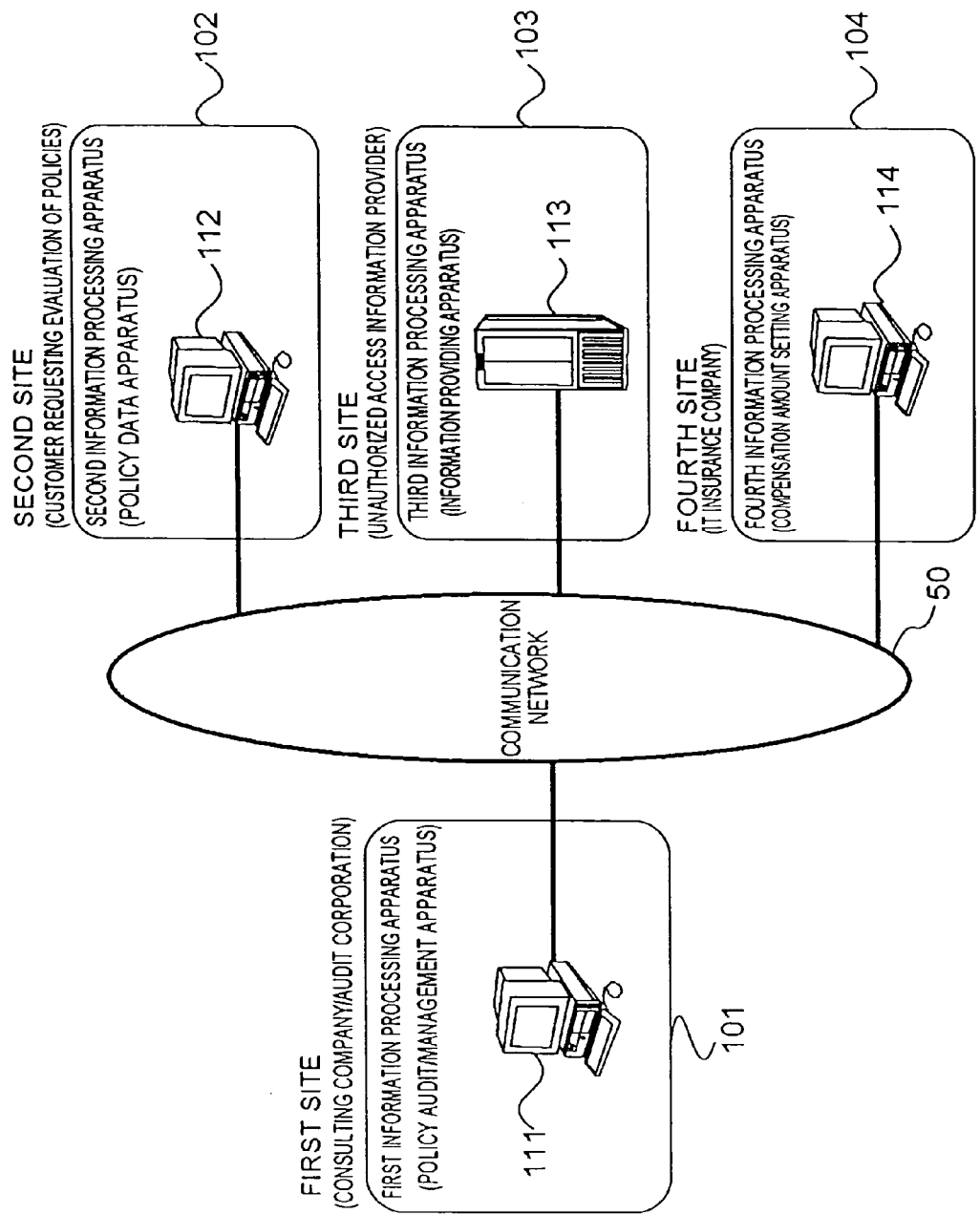
FIG. 10 is a view showing a schematic configuration of an information security policy evaluation system according to a second embodiment.

FIG. 10 shows a schematic configuration of an information security policy evaluation system (policy evaluation system) to be described as a second embodiment of the present invention. In this drawing, a first site 101 is, for example, a site of an evaluator who evaluates information security policies operated on a second site 102 in compliance with a request from a customer. For example, an organization running a system consultancy service or a system audit service can be the evaluator. The second site 102 is, for example, a site of the customer who requests the evaluation of the information security policies. A third site 103 is, for example, a site of a threat information provider who provides threat information. The threat information provider is collecting information on threats and providing the information. For example, since Internet service providers offering Internet connection services often grasp information on unauthorized access, such as DoS and DDOS attacks and the like, these can be the threat information provider. A fourth site 104 is a site of an insurer running an insurance service in which a subscriber is the customer operating the second site 102 and in which a product is insurance that compensates for a loss occurring in the case where the second site 102 has suffered a threat. On the fourth site 104, a fourth information processing apparatus 114 is provided.

Figure 11:
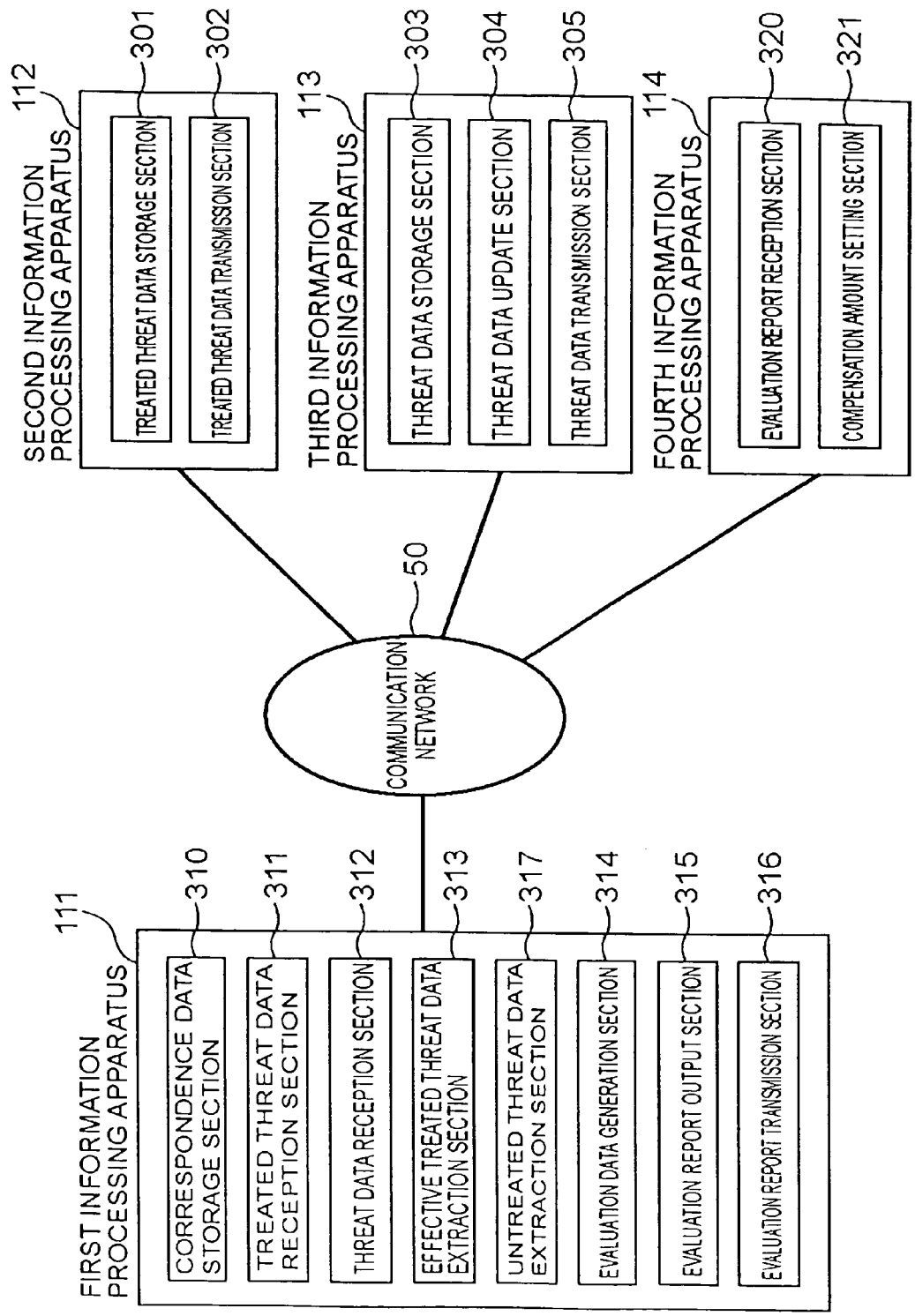
FIG. 11 is a diagram showing various kinds of functions implemented in first to fourth information processing apparatuses according to the second embodiment.

The hardware configuration of each of the first to fourth information processing apparatuses 111, 112, 113, and 114 is the same as that of the first embodiment and therefore will not be described further. FIG. 11 is a diagram showing various kinds of functions implemented in the first to fourth information processing apparatuses 111, 112, 113, and 114 according to the second embodiment of the present invention. As shown in this drawing, in the first to third information processing apparatuses 111, 112, and 113, a program is executed in each apparatus, whereby similar functions to those of the first embodiment are implemented. Incidentally, in addition to the configuration of the first embodiment, an evaluation report transmission section 316 of the first information processing apparatus 111 has the function of transmitting an evaluation report to the fourth information processing apparatus 114 through a communication network 50. The fourth information processing apparatus 114 has an evaluation report reception section 320 for receiving the evaluation report transmitted from the first information processing apparatus 111. Furthermore, the fourth information processing apparatus 114 has a compensation amount setting section 321 for setting a stored compensation amount to a compensation amount determined in accordance with the evaluation report received by the evaluation report reception section.

Figure 12:
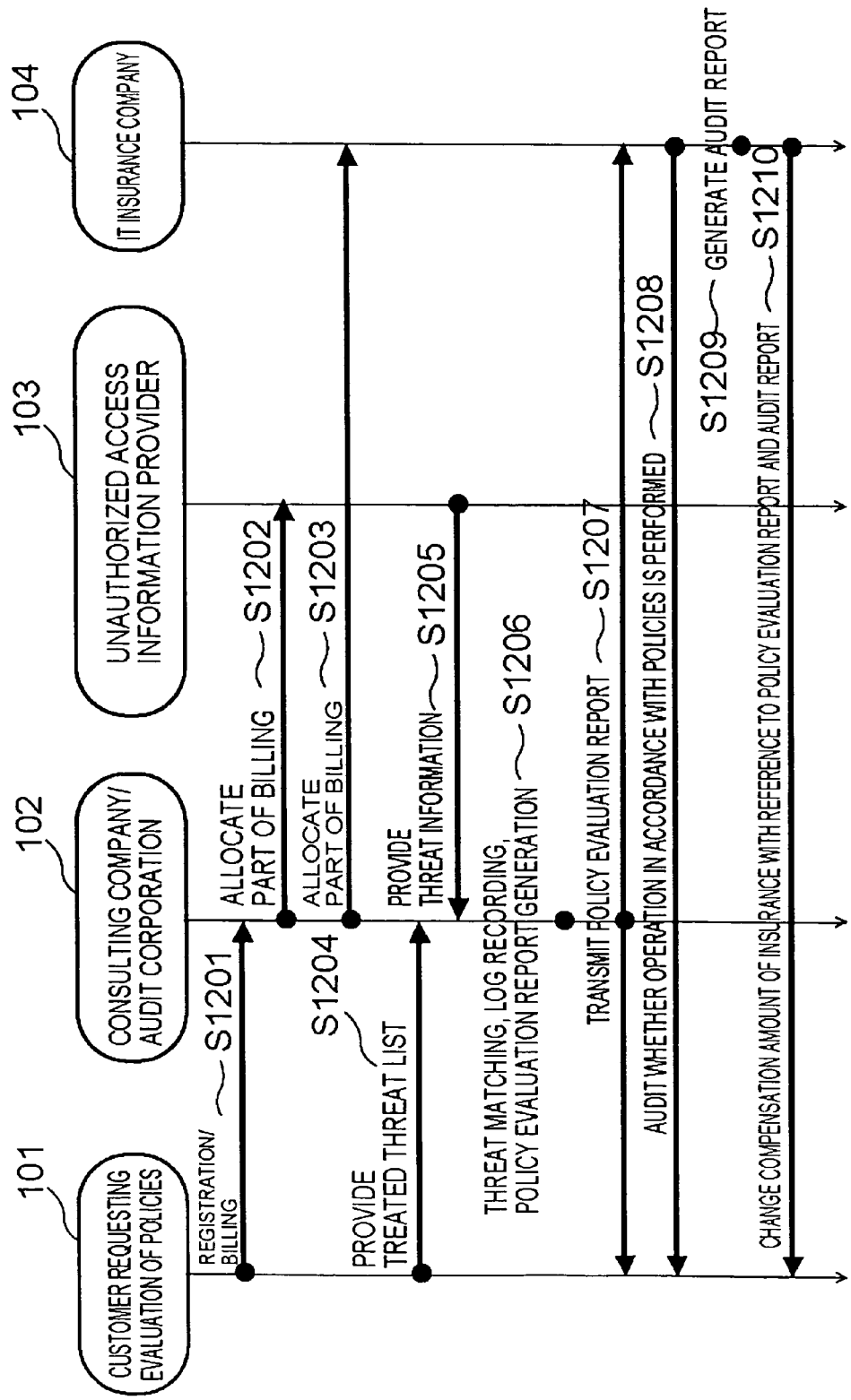
FIG. 12 is a diagram for explaining one form of business carried out by using the policy evaluation system according to the second embodiment.

FIG. 12 explains one form of business carried out by using the policy evaluation system of the above configuration. In this business form, the customer on the second site 102 registers to request the evaluator on the third site 103 to evaluate information security policies, and pays the evaluator an evaluation fee for requesting the evaluation of the information security policies. Here, the registration of the request for evaluation and the payment of the evaluation fee can be performed by, for example, accessing a Web page for registration provided by the evaluator. The evaluator accepts the registered request and receives the evaluation fee from the customer (S1201).

The evaluator pays the threat information provider part of the received evaluation fee as an information fee (S1202). The evaluator pays the insurer part of the received evaluation fee as a premium which the customer pays for the insurance (S1203).

The customer provides the evaluator with information security policies (treated threat list) which the customer is defining and operating on the second site 102 (S1204). Specifically, as described in the first embodiment, this is performed by transmitting a treated threat data management table 400 from the second information processing apparatus 112 to the first information processing apparatus 111.

The threat information provider provides the evaluator with information on threats having occurred in the past (S1205). Specifically, as described in the first embodiment, this is performed by transmitting a threat data management table 500 from the third information processing apparatus 113 to the first information processing apparatus 111.

The evaluator creates an evaluation report by matching the information security policies obtained from the customer and the information on threats obtained from the threat information provider (S1206). As described in the first embodiment, these processes are performed by processes by an effective treated threat data extraction section 313, an untreated threat data extraction section 317, and an evaluation data generation section 314.

The evaluator transmits the evaluation report to the customer and the insurer (S1207). This transmission is performed by the transmission and the like of the evaluation report from the first information processing apparatus 111 to the second and fourth information processing apparatuses 112 and 114 by means of data transmission, electronic mail, or the like. In the fourth information processing apparatus 114, the evaluation report is received by the evaluation report reception section 320.

The insurer audits whether the customer appropriately performs operation in accordance with the information security policies (S1208), and creates an audit report in which the result is described (S1209). The insurer determines a compensation amount in consideration for the evaluation and audit reports. For example, in the case where the insurer judges the effect, worth, and effectiveness of the information security policies which the customer on the second site 102 is defining and operating, to be high from the contents of the evaluation and audit reports, the insurer increases the compensation amount of the insurance while maintaining the premium at the same amount. In contrast, in the case where the effect, worth, and effectiveness of the information security policies which the customer on the second site 102 is defining and operating are judged to be low from the contents of the evaluation and audit reports, the compensation amount of the insurance is reduced while the premium is being maintained at the same amount. The compensation amount setting section 321 of the fourth information processing apparatus 114 has stored the compensation amount of the insurance, and resets the stored compensation amount to the changed compensation amount when the compensation amount is changed in accordance with the above determination (S1210).

As described above, the policy evaluation system of the second embodiment leads the customer on the second site 102 to make efforts to define appropriate information security policies so that the compensation amount of the insurance may be increased or may not be reduced for the same premium. On the other hand, the insurer can avoid the risk of setting a high compensation amount for a customer operating inappropriate information security policies. Moreover, a customer defining and operating appropriate information security policies selects insurance having the added value that a more appropriate compensation amount is set. Accordingly, the subscribers of the insurance increase and it leads to the increase in the profit of the insurer. Further, as the result of increased subscribers of the insurance, the customers of the evaluator increases, and the profit of the evaluator also increases. In addition, the profit of the threat information provider also increases. Thus, the policy evaluation system of the present embodiment allows all of the customer, the evaluator, the threat information provider, and the insurer to benefit from some kinds of merits.

Third Embodiment

Figure 13:
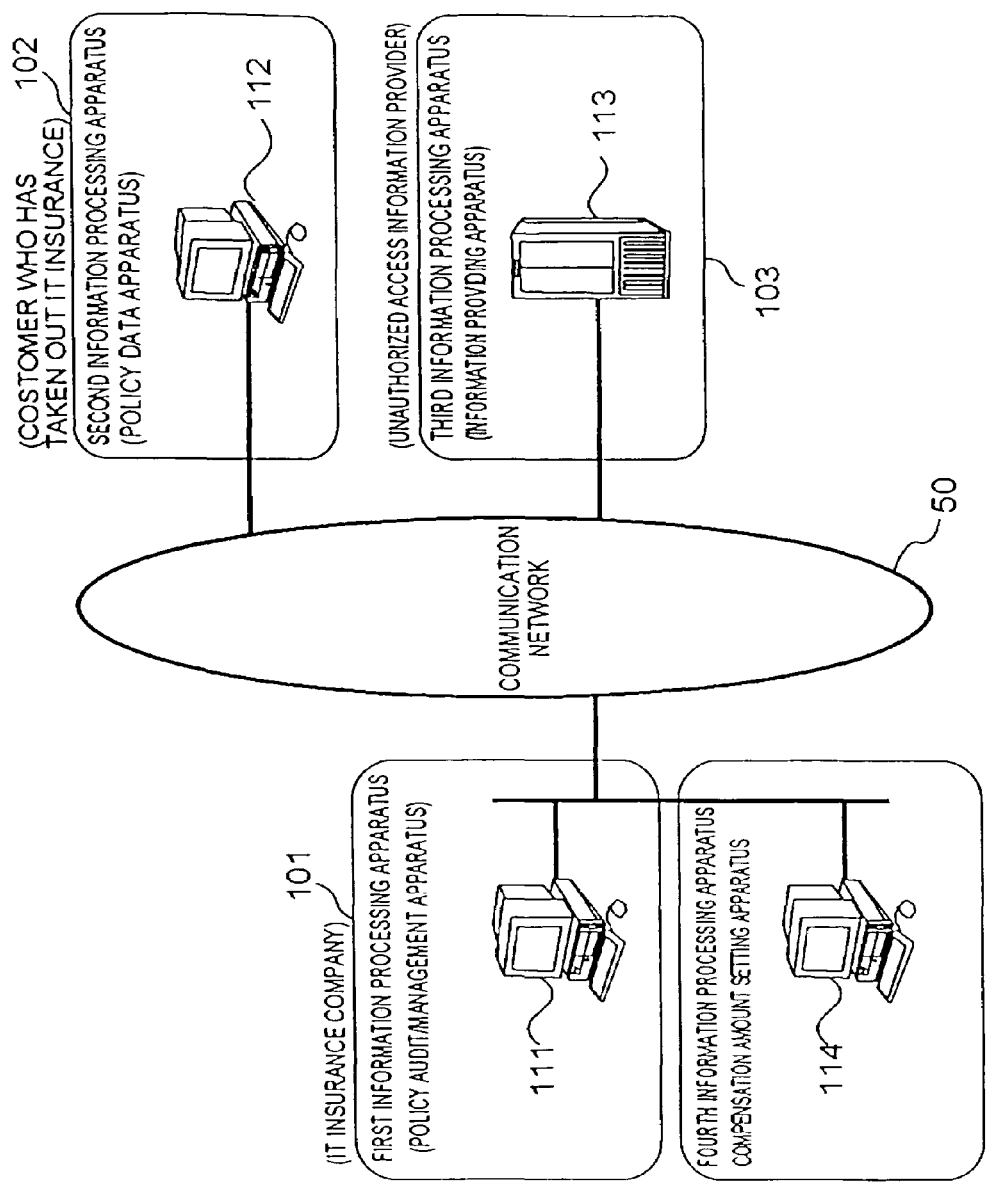
FIG. 13 is a view showing various kinds of functions implemented in first to fourth information processing apparatuses according to a third embodiment.

FIG. 13 shows a schematic configuration of an information security policy evaluation system (policy evaluation system) to be described as a third embodiment of the present invention. In this embodiment, the functions of the fourth site 104 are given to the first site 101 in the second embodiment. The evaluator operating the first site 101 is also an insurer, and the fourth information processing apparatus 114 is operated by the same organization as an organization operating the first information processing apparatus 111.

Figure 14:
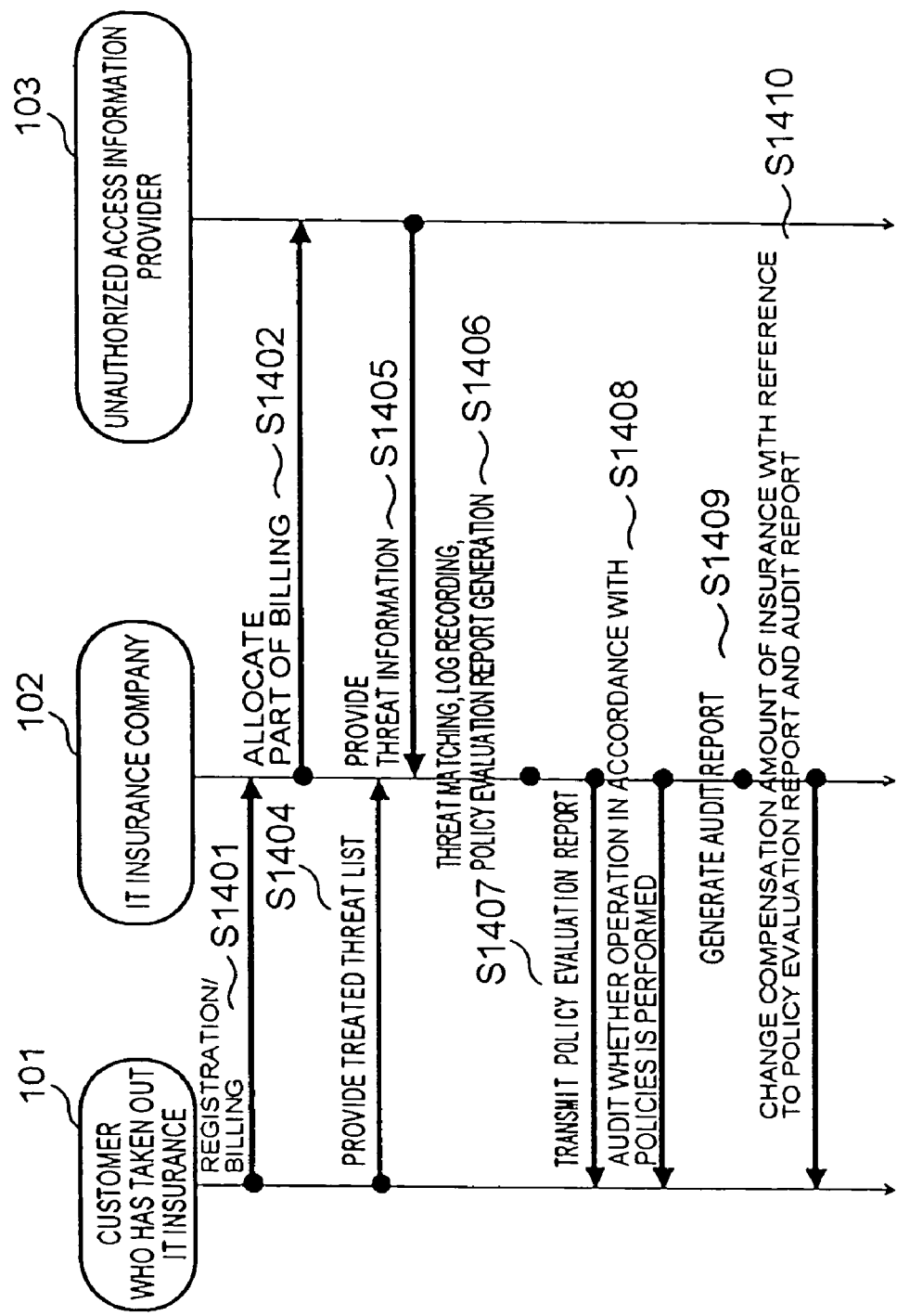
FIG. 14 is a diagram for explaining one form of business carried out by using a policy evaluation system according to the third embodiment.

FIG. 14 explains an example of business carried out by using the policy evaluation system of the above form. The customer on the second site 102 registers to request the evaluator (who is also an insurer) on the third site 103 to evaluate information security policies, and pays the evaluator an evaluation fee for requesting the evaluation of the information security policies. Here, the registration of the request for evaluation and the payment of the evaluation fee can be performed by, for example, accessing a Web page for registration provided by the evaluator. The evaluator accepts the registered request and receives the evaluation fee from the customer (S1401).

The evaluator pays the threat information provider part of the received evaluation fee as an information fee (S1402). Note that the evaluator (who is also an insurer) appropriates part of the received evaluation fee for a premium which the customer pays for the insurance.

The customer provides the evaluator with information security policies (treated threat list) which the customer is defining and operating on the second site 102 (S1404). As described in the first embodiment, this is performed by transmitting a treated threat data management table 400 from the second information processing apparatus 112 to the first information processing apparatus 111.

The threat information provider provides the evaluator with information on threats having occurred in the past (S1405). As described in the first embodiment, this is performed by transmitting a threat data management table 500 from the third information processing apparatus 113 to the first information processing apparatus 111.

The evaluator creates an evaluation report by matching the information security policies obtained from the customer and the information on threats obtained from the threat information provider (S1406). As described in the first embodiment, these processes are performed by functions of the effective treated threat data extraction section 313, the untreated threat data extraction section 317, and the evaluation data generation section 314.

The evaluator transmits the evaluation report to the customer (S1407). This transmission is performed by, for example, the transmission of the evaluation report from the first information processing apparatus 111 to the second information processing apparatus 112 by means of data transmission, electronic mail, or the like.

The evaluator (who is also an insurer) audits whether the customer appropriately performs operation in accordance with the information security policies (S1408), and creates an audit report in which the result is described (S1409). The evaluator determines a compensation amount in consideration for the evaluation and audit reports. For example, in the case where the evaluator judges the effect, worth, and effectiveness of the information security policies which the customer on the second site 102 is defining and operating, to be high from the contents of the evaluation and audit reports, the evaluator increases the compensation amount of the insurance while maintaining the premium at the same amount. In contrast, in the case where the effect, worth, and effectiveness of the information security policies which the customer on the second site 102 is defining and operating are judged to be low from the contents of the evaluation and audit reports, the compensation amount of the insurance is reduced while the premium is being maintained at the same amount. The compensation amount setting section of the fourth information processing apparatus 114 has stored the compensation amount of the insurance, and resets the stored compensation amount to the changed compensation amount when the compensation amount is changed in accordance with the above determination (S1410).

As described above, the policy evaluation system of the third embodiment leads the customer on the second site 102 to make efforts to define appropriate information security policies so that the compensation amount of the insurance may be increased or may not be reduced for the same premium. On the other hand, the evaluator, who is also an insurer, can avoid the risk of setting a high compensation amount for a customer operating inappropriate information security policies. Moreover, a customer defining and operating appropriate information security policies selects insurance having the added value that a higher compensation amount is set. Accordingly, the subscribers of the insurance increase, and it leads to the increase in the profit of the evaluator. Further, as the result of increased subscribers of the insurance, the profit of the evaluator also increases, and the profit of the threat information provider also increases. Thus, the policy evaluation system of the present embodiment allows the customer, the evaluator, who is also an insurer, and the threat information provider to benefit from some kinds of merits.

The above description is for easily understanding the present invention but not intended to limit the present invention. It is apparent that the present invention can be changed and modified without departing from the scope thereof and that equivalents thereof are included in the present invention.

We claim:

1. An information security policy evaluation system comprising:
 a first information processing apparatus located at a first site;
 a second information processing apparatus located at a second site;
 a third information processing apparatus located at a third site; and
 a fourth information processing apparatus located at a fourth site,
 the first to fourth information processing apparatuses in data communication with each other,
 wherein the second information processing apparatus having a treated threat data storage section for storing treated threat data, the treated threat data being data indicating a threat which can be countered by an information security policy operating at the second site,
 the third information processing apparatus having a threat data storage section for storing threat data which is data indicating a previous occurrence of a threat, and a loss amount data storage section for storing loss amount data, the loss amount data being data which indicates, for each piece of the threat data, a magnitude of a loss occurring in a case where damage is suffered due to a threat,
 the second information processing apparatus having a treated threat data transmission section for transmitting the treated threat data to the first information processing apparatus,
 the third information processing apparatus having a threat data transmission section for attaching the loss amount data to the threat data and transmitting the threat data to the first information processing apparatus,
 the first information processing apparatus having a treated threat data reception section for receiving the treated threat data and a threat data reception section for receiving the loss amount data as well as the threat data,
 the first information processing apparatus having a correspondence data storage section for storing correspondence data which is data indicating correspondence between the threat data and the treated threat data, and a loss amount data storage section for storing the received loss amount data,
 the first information processing apparatus having an effective treated threat data extraction section for extracting a piece of treated threat data to which there is a piece of threat data corresponding in the threat data received by the threat data reception section, out of the treated threat data received by the treated threat data reception section, based on the correspondence data, and an evaluation data generation section for generating evaluation data in which the extracted treated threat data is described,
 the fourth information processing apparatus having a compensation amount storage section for storing a compensation amount of insurance which an organization operating the second site has taken out and which compensates a loss occurring in a case where damage due to a threat is suffered,
 the first information processing apparatus having an evaluation data transmission section for transmitting the evaluation data generated by the evaluation data generation section to the fourth information processing apparatus,
 the fourth information processing apparatus having an evaluation data reception section for receiving the evaluation data,
 the fourth information processing apparatus having a compensation amount setting section for resetting the stored compensation amount to the compensation amount determined in accordance with the evaluation data received by the evaluation data reception section.

2. The information security policy evaluation system according to claim 1 wherein the loss amount data storing section of the third information processing apparatus stores a monetary damage amount indicating, for said each piece of the threat data, a magnitude of a loss occurring in a case where damage is suffered due to a threat.

3. The information security policy evaluation system according to claim 1, wherein
 the first information processing apparatus has a loss amount data storage section for storing loss amount data, the loss amount data being data which indicates, for said each piece of the threat data, a magnitude of a loss occurring in a case where damage is suffered due to a threat, and
 the evaluation data generation section has a consideration priority sort section for generating the evaluation data in which the threat data extracted by the untreated threat data extraction section is sorted and described in descending order of the loss amount data.

4. The information security policy evaluation system according to claim 1, wherein
 the threat data transmission section of the third information processing apparatus attaches the loss amount data to the threat data and transmits the loss amount data to the first information processing apparatus,
 the threat data reception section of the first information processing apparatus receives the loss amount data as well as the threat data, and
 the loss amount data storage section of the first information processing apparatus stores the received loss amount data.

5. The information security policy evaluation system according to claim 1 wherein the third information processing apparatus has a threat data update section for updating the threat data and the threat data transmission section transmits the updated threat data to the first information processing apparatus in a case where the threat data has been updated by the threat data update section.

6. An information security policy evaluation system comprising:
 a first information processing apparatus located at a first site;
 a second information processing apparatus located at a second site; and
 a third information processing apparatus located at a third site,
 a fourth information processing apparatus located at a fourth site,
 the first to fourth information processing apparatuses in data communication with each other, wherein:

the second information processing apparatus has a treated threat data storage section for storing treated threat data, the treated threat data being data indicating a threat which an information security policy operated on the second site can counter, the third information processing apparatus has a threat data storage section for storing threat data which is data indicating a threat having occurred in a past, and a loss amount data storage section for storing loss amount data, the loss amount data being data which indicates, for each piece of the threat data, a magnitude of a loss occurring in a case where damage is suffered due to a threat, the second information processing apparatus has a treated threat data transmission section for transmitting the treated threat data to the first information processing apparatus, the third information processing apparatus has a threat data transmission section for attaching the loss amount data to the threat data and transmitting the threat data to the first information processing apparatus, the first information processing apparatus has a treated threat data reception section for receiving the treated threat data and a threat data reception section for receiving the loss amount data as well as the threat data, the first information processing apparatus has a correspondence data storage section for storing correspondence data which is data indicating correspondence between the threat data and the treated threat data, and a loss amount data storage section for storing the received loss amount data, the first information processing apparatus has an untreated threat data extraction section for extracting a piece of threat data to which there is no piece of treated threat data corresponding in the treated threat data received by the treated threat data reception section, out of the threat data received by the threat data reception section, based on the correspondence data, and an evaluation data generation section for generating evaluation data in which the extracted threat data is described, the fourth information processing apparatus has a compensation amount storage section for storing a compensation amount of insurance which an organization operating the second site has taken out and which compensates a loss occurring in a case where damage due to a threat is suffered, the first information processing apparatus has an evaluation data transmission section for transmitting the evaluation data generated by the evaluation data generation section to the fourth information processing apparatus, the fourth information processing apparatus has an evaluation data reception section for receiving the evaluation data, and the fourth information processing apparatus has a compensation amount setting section for resetting the stored compensation amount to the compensation amount determined in accordance with the evaluation data received by the evaluation data reception section.

7. The information security policy evaluation system according to claim 6 wherein the loss amount data storing section of the third information processing apparatus stores a monetary damage amount indicating, for said each piece of the threat data, a magnitude of a loss occurring in a case where damage is suffered due to a threat.

8. The information security policy evaluation system according to claim 6 wherein the third information processing apparatus has a threat data update section for updating the threat data and, the threat data transmission section transmits the updated threat data to the first information processing apparatus in a case where the threat data has been updated by the threat data update section.

9. An information security policy evaluation system comprising:

a first information processing apparatus located at a first site;

a second information processing apparatus located at a second site; and a third information processing apparatus located at a third site, the first to third information processing apparatuses being capable of communicating with each other, wherein the second information processing apparatus has a policy data storage section for storing policy data which is data indicating an information about a security policy operated on the second site, wherein the third information processing apparatus has a threat data storage section for storing threat data which is data indicating a threat having occurred in a past, wherein the second information processing apparatus has a policy data transmission section for transmitting the policy data to the first information processing apparatus, wherein the third information processing apparatus has a threat data transmission section for transmitting the threat data to the first information processing apparatus, wherein the first information processing apparatus has a policy data reception section for receiving the policy data and a threat data reception section for receiving the threat data, wherein the first information processing apparatus has a correspondence data storage section for storing correspondence data which is data indicating correspondence between the threat data and policy data indicating an effective information security policy against a threat indicated by the threat data, and wherein the first information processing apparatus has an effective policy data extraction section for extracting a piece of policy data to which there is a piece of threat data corresponding in the threat data received by the threat data reception section, out of the policy data received by the policy data reception section, based on the correspondence data, and an evaluation data generation section for generating evaluation data in which the extracted policy data is described.

10. An information security policy evaluation system comprising:

a first information processing apparatus located on a first site;

a second information processing apparatus located on a second site; and a third information processing apparatus located on a third site, the first to third information processing apparatuses being capable of communicating with each other, wherein the second information processing apparatus has a policy data storage section for storing policy data which is data indicating an information about a security policy operated on the second site, the third information processing apparatus has a threat data storage section for storing threat data which is data indicating a threat having occurred in a past, the second information processing apparatus has a policy data transmission section for transmitting the policy data to the first information processing apparatus, the third information processing apparatus has a threat data transmission section for transmitting the threat data to the first information processing apparatus, the first information processing apparatus has a policy data reception section for receiving the policy data and a threat data reception section for receiving the threat data, the first information processing apparatus has a correspondence data storage section for storing correspondence data which is data indicating correspondence between the threat data and policy data indicating an effective information security policy against a threat indicated by the threat data, and the first information processing apparatus has an untreated threat data extraction section for extracting a piece of threat data to which there is no piece of policy data corresponding in the policy data received by the policy data reception section, out of the threat data received by the threat data reception section, based on the correspondence data, and an evaluation data generation section for generating evaluation data in which the extracted threat data is described.

11. A method of controlling an information security policy evaluation system having a first information processing apparatus located on a first site, a second information processing apparatus located on a second site, a third information processing apparatus located on a third site, a fourth information processing apparatus located on a fourth site, the first to fourth information processing apparatuses being capable of communicating with each other, the method comprising:

the second information processing apparatus storing treated threat data, the treated threat data being data indicating a threat which an information security policy operated on the second site can counter, the third information processing apparatus storing threat data which is data indicating a threat having occurred in a past and loss amount data, the loss amount data being data which indicates, for each piece of the threat data, a magnitude of a loss occurring in a case where damage is suffered due to a threat, the second information processing apparatus transmitting the treated threat data to the first information processing apparatus, the third information processing apparatus attaching the loss amount data to the threat data and transmitting the threat data to the first information processing apparatus, the first information processing apparatus receiving the treated threat data, the threat data, and the loss amount data as well as the threat data, the first information processing apparatus storing correspondence data which is data indicating correspondence between the threat data and the treated threat data, and the received loss amount data, the first information processing apparatus extracting a piece of treated threat data to which there is a piece of threat data corresponding in the received threat data, out of the received treated threat data based on the correspondence data, and generating evaluation data in which the extracted treated threat data is described, the fourth information processing apparatus storing a compensation amount of insurance which an organization operating the second site has taken out and which compensates a loss occurring in a case where damage due to a threat is suffered, the first information processing apparatus transmitting the evaluation data generated by the evaluation data generation section to the fourth information processing apparatus, the fourth information processing apparatus receiving the evaluation data and resetting the stored compensation amount to the compensation amount determined in accordance with the evaluation data received by the evaluation data reception section.

12. A method of controlling an information security policy evaluation system having a first information processing apparatus located on a first site, a second information processing apparatus located on a second site, a third information processing apparatus located on a third site, a fourth information processing apparatus located on a fourth site, the first to fourth information processing apparatuses being capable of communicating with each other, the method comprising:

the second information processing apparatus storing treated threat data, the treated threat data being data indicating a threat which an information security policy operated on the second site can counter, the third information processing apparatus storing threat data which is data indicating a threat having occurred in a past and loss amount data, the loss amount data being data which indicates, for each piece of the threat data, a magnitude of a loss occurring in a case where damage is suffered due to a threat, the second information processing apparatus transmitting the treated threat data to the first information processing apparatus, the third information processing apparatus attaching the loss amount data to the threat data and transmitting the threat data to the first information processing apparatus, the first information processing apparatus receiving the treated threat data and the loss amount data as well as the threat data, the first information processing apparatus storing correspondence data which is data indicating correspondence between the threat data and the treated threat data and the received loss amount data the first information processing apparatus extracting a piece of threat data to which there is no piece of treated threat data corresponding in the received treated threat data, out of the received threat data based on the correspondence data, and generating evaluation data in which the extracted threat data is described, the fourth information processing apparatus storing a compensation amount of insurance which an organization operating the second site has taken out and which compensates a loss occurring in a case where damage due to a threat is suffered, the first information processing apparatus transmitting the evaluation data generated by the evaluation data generation section to the fourth information processing apparatus, the fourth information processing apparatus receiving the evaluation data and resetting the stored compensation amount to the compensation amount determined in accordance with the evaluation data received by the evaluation data reception section.

* * * * *